US008428366B2

(12) United States Patent
Brasnett et al.

(10) Patent No.: US 8,428,366 B2

(45) Date of Patent: Apr. 23, 2013

(54) HIGH PERFORMANCE IMAGE IDENTIFICATION

(75) Inventors: Paul Brasnett, Surbiton (GB); Miroslaw Bober, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 732 days.

(21) Appl. No.: 12/663,479

(22) PCT Filed: Mar. 12, 2008

(86) PCT No.: PCT/GB2008/000867

§ 371 (c)(1), (2), (4) Date: Dec. 7, 2009

(87) PCT Pub. No.: WO2009/001025

PCT Pub. Date: Dec. 31, 2008

(65) Prior Publication Data

US 2010/0183231 A1 Jul. 22, 2010

(30) Foreign Application Priority Data

Jun. 26, 2007 (GB) .................................. 0712388.8

(51) Int. Cl.
*G06K 9/36* (2006.01)

(52) U.S. Cl.
USPC .......................................................... 382/206

(58) Field of Classification Search ........................ None
See application file for complete search history.

(56) References Cited

U.S. PATENT DOCUMENTS 5,291,560 A * 3/1994 Daugman ..................... 382/117

OTHER PUBLICATIONS

Srisuk et al., A Face Authentication System Using the Trace Transform, Pattern Analysis Applications, vol. 8, Jul. 2, 2005, pp. 50-61.*

"MPEG-7 Visual part of eXperimentation Model Version 30.0", Video Standards and Drafts, No. W8970, Apr. 29, 2007, XP030015464.

Brasnett et al., "Visual Identifier Proposal & Evaluation Results (VCE-6)", O Standards and Drafts, M14225, Jan. 10, 2007, XP030042881.

Srisuk et al., "Face Authentication using the trace Transform", Proceedings 2003 IEEE Computer Society Conference on Computer Vision and Pattern Recognition. CVPR 2003, Madison, WI Jun. 18-20, 2003, vol. 1, pp. 305-312, XP010644912.

Kadyrov et al., "The Trace Transform and Its Applications", IEEE Transactions on Pattern Analysis and Machine Intelligence, IEEE Service Center, Los Alamitos, CA, Aug. 1, 2001, vol. 23, No. 8, pp. 811-828, XP001091621.

Kadyrov et al., "Object signatures invariant to affine distortions derived from the Trace transform", Image and Vision Computing, 2003, vol. 21, pp. 1135-1143, XP002495049.

(Continued)

*Primary Examiner* — Brian P Werner

(74) *Attorney, Agent, or Firm* — Birch, Stewart, Kolasch & Birch, LLP.

(57) ABSTRACT

A method and apparatus for deriving a representation of an image is described. The method involves processing signals corresponding to the image. A two-dimensional function of the image, such as a Trace transform (T (d, θ)), of the image using at least one functional T, is derived and processed using a mask function (β) to derive an intermediate representation of the image, corresponding to a one-dimensional function. In one embodiment, the mask function defines pairs of image bands of the Trace transform in the Trace domain. The representation of the image may be derived by applying existing techniques to the derived one-dimensional function.

23 Claims, 16 Drawing Sheets

OTHER PUBLICATIONS

Turan et al., "Trace transform and KLT based invariant features and image recognition system", Acta Electrotechnica et Informatica, Faculty of Electrical Engineering and Informatics, Kosice, SK. Mar. 1, 2006. vol. 6, No. 3, pp. 1-11, XP002411465.

Seo et al., "A robust image fingerprinting system using the Radon transform", Signal Processing: Image Communication, Elsevier Science Publishers, Amsterdam, NL, Apr. 1, 2004, vol. 19, No. 4, pp. 325-339, XP004495308.

Petrou et al., Texture recognition from sparsely and irregularly sampled data, Computer Vision and Image Understanding, Academic Press, US, Apr. 1, 2006, vol. 102, No. 1, pp. 95-104, XP005311573.

* cited by examiner (a) (b)

(c)

(a)

(b)

(c)

HIGH PERFORMANCE IMAGE IDENTIFICATION

BACKGROUND OF THE INVENTION

1. Field of the Invention

The present invention relates to a method and apparatus for representing an image, and, in addition, a method and apparatus for comparing or matching images, for example, for the purposes of searching or validation.

2. Description of the Background Art

The present invention relates to improvements upon the image identification techniques disclosed in co-pending European patent application No: EP 06255239.3 and UK patent application No: GB 0700468.2 (references [6] and [7] infra). The contents of EP 06255239.3 and GB 0700468.2 are incorporated herein by reference. Details of the inventions and embodiments in EP 06255239.3 and GB 0700468.2 apply analogously to the present invention and embodiments.

The image identification methods and apparatuses described in EP 06255239.3 and GB 0700468.2, which, in each case, extracts a short binary descriptor from an image (see FIG. 2) address many of the drawbacks of the prior art and in particular are characterised by:

- reduced computational complexity for both feature extraction and matching,
- reduced image descriptor size,
- increased robustness to various image modifications, and
- reduced false alarm rate to 1 ppm level while maintaining detection rate of over 98% for a wide range of image modifications.

However, in many practical applications it is necessary for the false alarm rate to be significantly lower than 1 ppm and desirable for the detection rates to be above 98%. Accordingly, it would be desirable to increase the average detection rate to above 98%. In addition, it would be desirable to improve robustness to histogram equalisation and image cropping.

SUMMARY OF THE INVENTION

According to a first aspect, the present invention provides a method of deriving a representation of an image as defined in accompanying claim 1.

Further aspects of the present invention include use of a representation of an image derived using a method according to a the first aspect of the present invention, an apparatus for executing the method according to the first aspect of the present invention, and a computer-readable storage medium comprising instructions for executing the method according to the first aspect of the present invention.

Preferred and optional features of the embodiments are set out in the dependent claims.

The present invention concerns a new method of extracting visual identification features from the Trace transform of an image (or an equivalent two dimensional function of the image). The methods described in patent applications EP 06255239.3 and GB 0700468.2, which are incorporated herein by reference, use the Trace transform as an intermediate representation. The Trace transform projects all possible lines over an image and binary component identifiers are extracted from the entire Trace Transform representation and then combined together.

The present invention involves extracting one or more representations, each of which is constructed from a subset of the possible lines in an image, i.e. the Trace transform is spatially restricted (masked) when additional binary component identifiers are derived from the intermediate representation (as described below). The subset, or a plurality of such subsets, may be used to extract further identification information which relates to a particular part of the image. This additional identification information can be added to a representation of the whole image, derived using other methods such as the methods of patent applications EP 06255239.3 and GB 0700468.2. It has been found that including this additional information significantly boosts image identification performance and robustness. Furthermore, an alternative pre-processing method may be used to further improve the results.

In the present application, the term "functional" has its normal mathematical meaning. In particular, a functional is a real-valued function on a vector space V, usually of functions. In the case of the Trace transform, functionals are applied over lines in the image.

In the methods described in co-pending patent applications EP 06255239.3 and GB 0700468.2, the Trace transform is computed by tracing an image with straight lines along which a certain functional T of the image intensity or colour function is calculated. Different functionals T are used to produce different Trace transforms from a single input image. Since in the 2D plane a line is characterised by two parameters, angle θ and distance d, a Trace transform of the image is a 2D function of the parameters of each tracing line. Next, the circus function is computed by applying a diametrical functional P along the columns of the Trace transform. In GB 0700468.2, further processing is performed, in which, effectively, the image is additionally traced with strips (as shown in FIG. 11) and/or double cones (as shown in FIG. 12) to reduce the resolution of the Trace transform of the image, from which the circus function is derived. Strips of different width and/or cones of different opening angle are used to obtain a multi-resolution representation. From each circus function, a component binary identifier is constructed by computing the frequency representation of the circus function (e.g. by a Fourier transform) and taking the sign of a certain function defined on the frequency amplitude components (e.g. the function could be the difference in magnitudes of any two neighbouring frequency amplitudes). It is possible to combine selected string fragments from a 'family' of component identifiers obtained by using different functionals with strips and/or double cones into a single descriptor as disclosed in reference [4] infra.

Extraction of the descriptors can be implemented very efficiently by implicitly computing the Trace transform values along the strips and cones in the Trace transform domain.

According to one aspect of the present invention a mask function extracts spatially limited regions of the Trace transform, such as bands in the Trace domain, which, in turn, are used to compute the circus function from which the additional binary descriptors are extracted. As explained below, bands in the Trace domain correspond to cones in the image domain. It should be highlighted that in the techniques disclosed in co-pending patent applications EP 06255239.3 and GB 0700468.2 each component binary descriptor contains a representation of every possible line projected over the image. In contrast, in accordance with one aspect of the present invention each component descriptor focuses on a particular subset of lines within a selected part or region of the image, thereby providing further independent and robust identification information. By adding this additional component descriptor to prior art descriptors, a very significant improvement in performance can be achieved. In particular robustness is improved to colour altering transformations such as histogram equalisation and to content changing modifications, particularly cropping. Moreover, typically the average detection rate may be increased to 99.80% at a tenfold reduced false alarm rate of 0.1 ppm in comparison to earlier techniques.

According to another aspect of the invention, a tapering may be added to the boundary of an extracted circular sub-image to improve performance further.

BRIEF DESCRIPTION OF THE DRAWINGS

Embodiments of the invention will be described with reference to the accompanying drawings, of which.

DETAILED DESCRIPTION OF THE EMBODIMENTS

Various embodiments for deriving a representation of an image, specifically an image identifier, and for using such a representation/identifier for the purposes of, for example, identification, matching or validation of an image or images, will be described below. The present invention is especially useful for, but is not restricted to, identifying an image. In the described embodiments, an "image identifier" (or simply "identifier") is an example of a representation of an image and the term is used merely to denote a representation of an image, or descriptor.

The skilled person will appreciate that the specific design details of a image identification apparatus and method, according to an embodiment of the invention, and the derivation of an image identifier for use in image identification, is determined by the requirements related to the type of image modifications it should be robust to, the size of the identifier, extraction and matching complexity, target false-alarm rate, etc.

The following example illustrates a generic design that results in an identifier that is robust to the following modifications to an image (this is not an exhaustive list):

| |
|---|
| Colour reduction, |
| Blurring, |
| Brightness Change, |
| Flip (left-right & top-bottom), |
| Greyscale Conversion, |
| Histogram Equalisation, |
| JPEG Compression, |
| Noise, |
| Rotation, |
| Cropping and |
| Scaling. |

It has been found that this generic design can typically achieve a very low false-alarm rate of less than 0.1 parts per million (ppm) on a broad class of images and detection rates of 99.8%.

Figure 1:
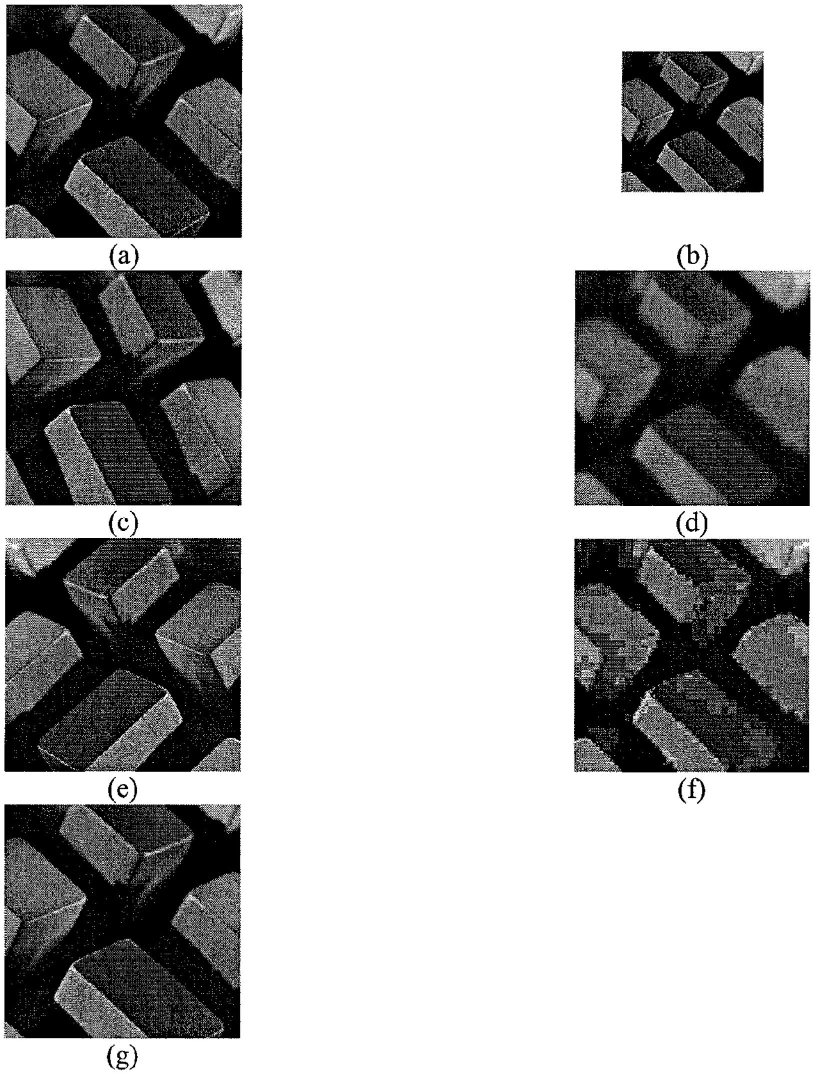
FIG. 1*a* shows an image.
FIG. 1*b* shows a reduced version of the image of FIG. 1*a;*
FIG. 1*c* shows a rotated version of the image of FIG. 1*a;*
FIG. 1*d* shows a blurred version of the image of FIG. 1*a;*
FIG. 1*e* shows a flipped (left-right) version of the image of FIG. 1*a;*
FIG. 1*f* shows a heavily compressed version of the image of FIG. 1*a;*
FIG. 1*g* shows a cropped version of the image of FIG. 1*a;*

FIG. 1 shows an example of an image and modified versions of the image. More specifically, FIG. 1*a* is an original image, FIG. 1*b* is a reduced version of the image of FIG. 1*a*, FIG. 1*c* is a rotated version of the image of FIG. 1*a*, FIG. 1*d* is a blurred version of the image of FIG. 1*a*, FIG. 1*e* is a flipped version of the image of FIG. 1*a*, FIG. 1*f* is a compressed version of the image of FIG. 1*a* and FIG. 1*g* is a cropped version of the image of FIG. 1*a*.

Figure 2:
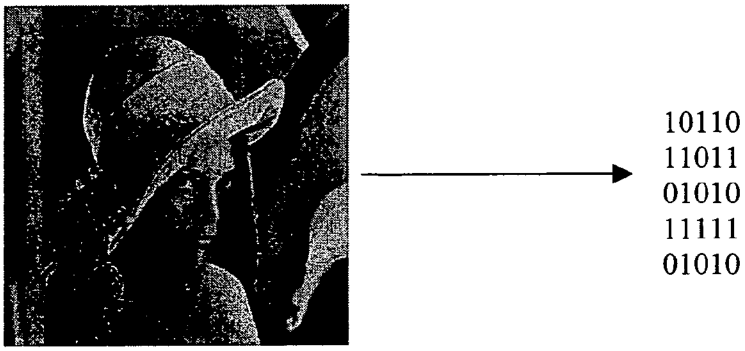
FIG. 2 shows an image and a bit string representation of the image according to the prior art.

An embodiment of the invention derives a representation of an image, and more specifically, an image identifier, by processing signals corresponding to the image. Typically, the image identifier is a binary descriptor, as shown in FIG. 2 by way of example.

Figure 3:
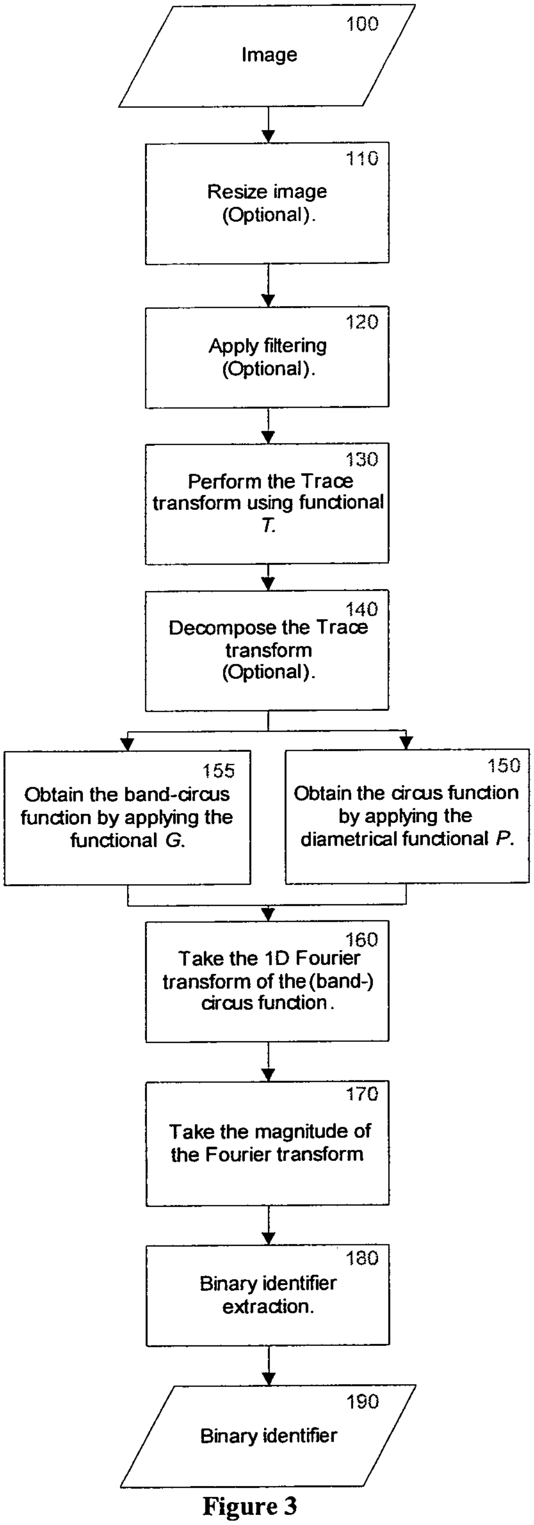
FIG. 3 is a diagram illustrating steps of a method of an embodiment of the invention.

FIG. 3 shows steps of a method of deriving an image identifier according to an embodiment of the invention, that is, an identifier extraction process.

In the initial stage of extraction the image is optionally pre-processed by resizing (step 110) and filtering (step 120). The resizing step 110 is used to normalise the images before processing. The filtering step 120 can comprise of filtering to remove effects such as aliasing it can also include region selection and tapering. In the preferred embodiment the image is resized to a resolution of 192×N or N×192, where N>192 and preserving the aspect ratio. In another embodiment the image is resized to a square of 192×192. The image is then low pass filtered with a 3×3 Gaussian kernel. A circular region is extracted from the centre of the image for further processing. According to an aspect of the invention, performance is improved by using a tapered edge when extracting the circular centre region. The preferred embodiment uses a taper size of 7 pixels. The pre-processing steps are optional and can include any combination of the above.

Figure 5:
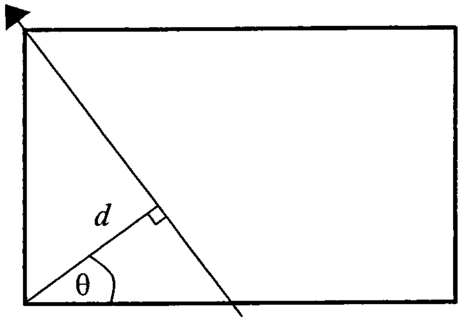
FIG. 5 is a diagram illustrating the line parameterisation for the Trace transform.

In step 130, a Trace transform T(d,θ) of the image is performed where, as shown in FIG. 5, a line in the image is parameterised by d and θ. The Trace transform projects all possible lines over the image and applies a functional T over these lines. A functional is a real-valued function on a vector space V, usually of functions. In the case of the Trace transform a functional is applied over lines in the image. An example Trace transform of FIG. 6*a* is shown in FIG. 6*b*. The result of the Trace transform may be decomposed in step 140, to reduce its resolution in either or both of its dimensions d, θ. In the methods of EP 06255239.3 and GB 0700468.2, in subsequent step 150, a further functional P is then applied to the columns of the Trace transform to give a vector of real numbers (i.e. a one dimensional function). This second functional P is known as the diametrical functional and the resulting vector is known as the circus function. FIG. 6*c* shows an example circus function of FIG. 6*a*. A third functional, the circus functional, can be applied to the circus function to give a single number, although this step is not used in the preferred embodiment. The properties of the result can be controlled by appropriate choices of the functionals (Trace, diametrical and circus). Full details of the Trace transform, including examples of images and corresponding Trace transforms, can be found, for example, in reference [1] infra, which is incorporated herein by reference.

Figure 6:
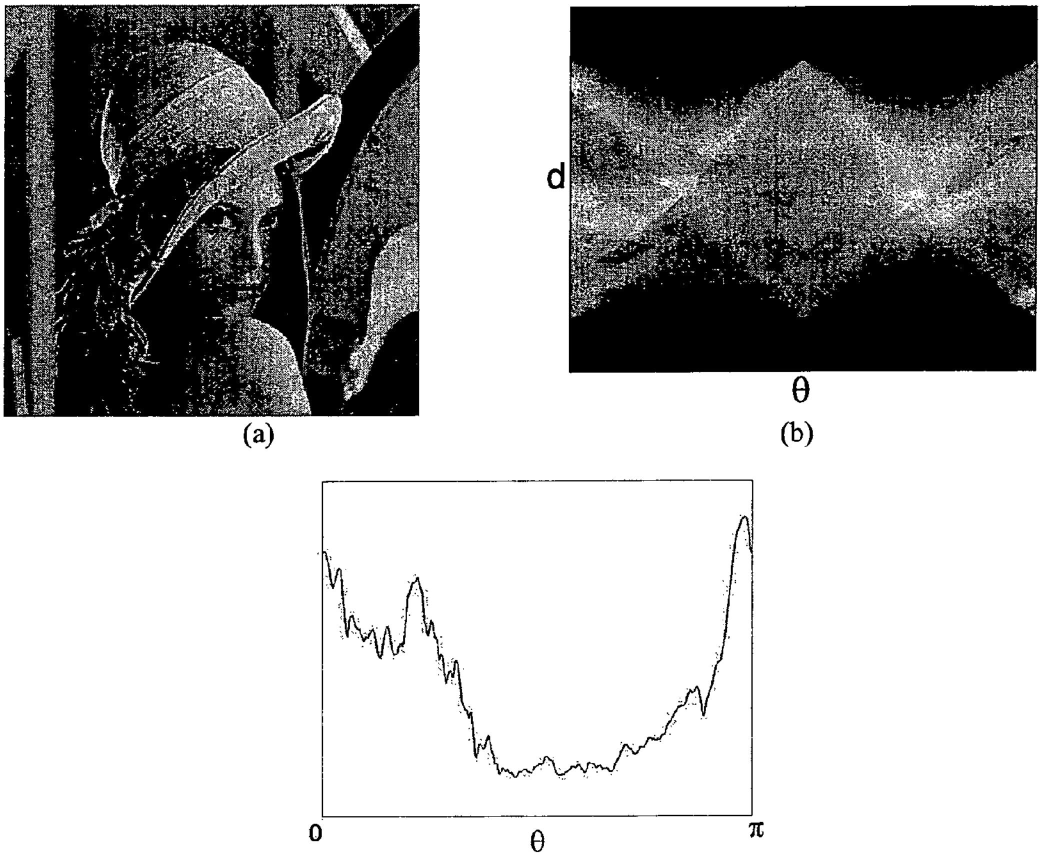
FIG. 6*a* shows an image.
FIG. 6*b* shows a Trace transform of the image of FIG. 6*a;*
FIG. 6*c* show a circus function of the image of FIG. 6*a;*

FIG. 6 shows the Trace transform T(d,θ) of an image extracted with functional T $$\int \xi(t)dt, \tag{1}$$

and the circus function resulting from applying the diametrical functional P $$\max(\xi(t)). \tag{2}$$

Figure 7:
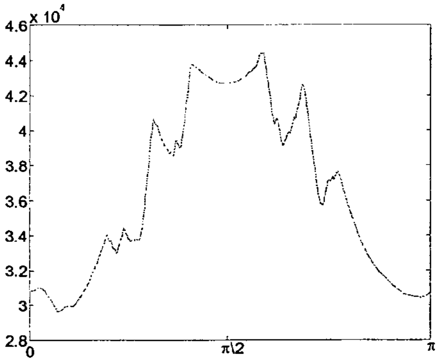
FIGS. 7*a-c* illustrate functions derived from different versions of an image.
Figure 7:
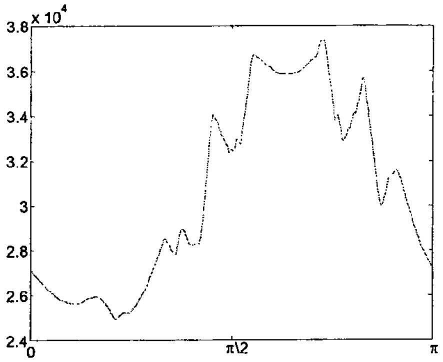
Figure 7:
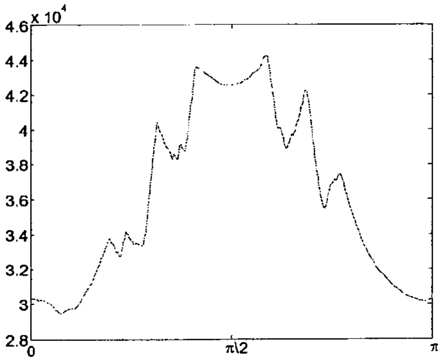

FIG. 7 shows how the circus function is affected by different image processing operations. It shows the circus function corresponding to different modified versions of an image. FIG. 7*a* is the circus function of the original image; FIG. 7*b* is the circus function of a rotated version of the image and FIG. 7*c* is the circus function of a blurred version of the image. It can be seen that rotation shifts the function (as well as causing a scale change).

Referring back to FIG. 3, in accordance with an aspect of the present invention, step 155 is introduced to obtain a band-circus function as an alternative to the circus function extracted by step 150. Step 155 restricts the Trace transform to a subset of lines of the image, by selecting and processing values from only a part of the Trace transform, as described in detail below.

In accordance with a preferred embodiment of the present invention, as shown in FIG. 3, a binary identifier is extracted from the band-circus function (output of the block 155) via a frequency representation in steps 160-180.

As discussed in co-pending patent applications EP 06255239.3 and GB 0700468.2, it can be shown that for the majority of image modifications listed above and with a suitable choice of functionals T, P the circus function $f(a)$ of image a is at most a shifted or scaled (in amplitude) version of the circus function $f(a')$ of the modified image a' (see Section 3 of reference [1] infra).

$$f(a')=\kappa f(a-\theta). \tag{3}$$

Now, by taking the Fourier transform of equation (3) we get $$F(\Phi) = F[\kappa f(a-\theta)], \tag{4}$$

$$= \kappa F[f(a-\theta)], \tag{5}$$

$$= \kappa \exp^{-j\theta\Phi} F[f(a)]. \tag{6}$$

Then taking the magnitude of equation (6) gives $$|F(\Phi)|=|\kappa F[f(a)]|. \tag{7}$$

From equation (7) we can see that the magnitude components of the frequency representations corresponding to the modified image and original image are now equivalent except for the scaling factor κ.

Figure 4:
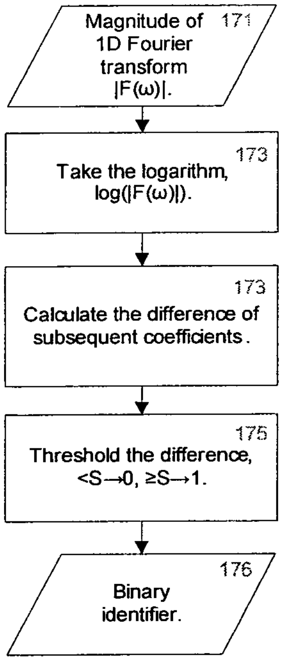
FIG. 4 is a diagram illustrating extraction of the binary identifier from the circus function.

FIG. 4 shows one example of a method of defining a binary function on the Fourier transform. In particular, after obtaining the Fourier transform in step 170 of FIG. 3, the logarithm of the magnitude of the Fourier transform is obtained in step 173.

According to an embodiment, a function c(ω) is now defined on the magnitude coefficients of the Fourier transform. One illustration of this function is taking the difference of neighbouring coefficients (step 174)

$$c(\omega)=|F(\omega)|-|F(\omega+1)| \tag{8}$$

A binary string can be extracted by applying a threshold to the resulting vector from equation (8), in step 175, such that $$b_\omega = \begin{cases} 0, & c(\omega) < S \\ 1, & c(\omega) \geq S \end{cases} \text{ for all } \omega. \tag{9}$$

Suitable choices for S include S=0 and S=mean(c). The image identifier is then made up of these binary string values $B=\{b_0, \ldots, b_n\}$.

To perform identifier matching between two different identifiers $B_1$ and $B_2$, both of length N, the normalised Hamming distance is taken $$H(B_1, B_2) = \frac{1}{N}\sum_N B_1 \otimes B_2, \tag{10}$$

where ⊗ is the exclusive OR (XOR) operator. Other methods of comparing identifiers or representations can also be used.

The desired trade-off between the identifier size, identification performance and robustness can be achieved by selection of certain bits in the identifier. The bits corresponding to the lower frequencies are generally more robust and the higher bits are more discriminating. The selection of bits can also be optimised experimentally using a large database of images and their modified versions by using the optimisation presented in reference [3] infra, or one of the prior art optimisation methods reference [5] infra. In one particular embodiment of the invention the first bit, $b_0$ which corresponds to the DC component, is ignored and then the identifier is made up of the next 48 bits.

Figure 9:
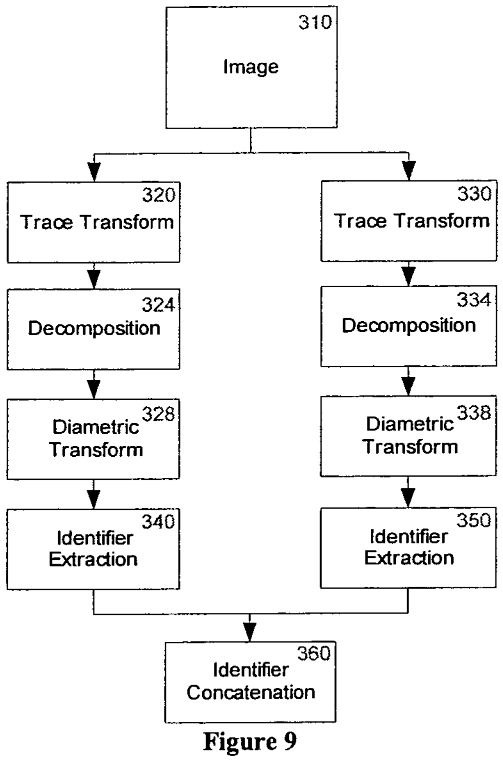
FIG. 9 is a block diagram illustrating an embodiment using multiple Trace transforms.
Figure 10:
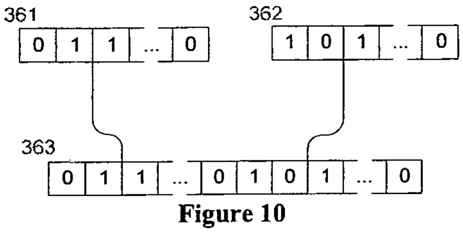
FIG. 10 illustrates bit stream produced according to the embodiment of FIG. 8.

Improvements to the performance can be achieved by using one or more Trace functionals to obtain multiple Trace transforms. Then one or more diametrical functionals can be used to obtain a plurality of circus functions. A 'basic' binary identifier can be extracted from each circus function. Bits from these basic identifiers can then be combined as shown in FIGS. 9 and 10. The specific method for combining binary strings from two or more separate circus functions 361 and 362 is to concatenate them to obtain the identifier 363.

Good results may be obtained in this way by using the Trace functional in equation (1) supra with the diametrical functional given by equation (2) supra for one binary string and then Trace functional in (1) with the following diametrical functional (11)

$$\int|\xi(t)'|dt, \tag{11}$$

to obtain the second string. The first bit of each binary string (which corresponds to the DC component of the Fourier transform) is skipped and then the subsequent 64 bits from both strings are concatenated to obtain a 128 bit identifier.

In one embodiment, further information is extracted by forming a multi-resolution representation of the Trace transform. Decomposition, to reduce the resolution of the image data (e.g. Trace transform), can be performed in one or two dimensions. The diametrical functionals are then be applied to obtain one or more band-circus functions and the binary string is extracted as previously in co-pending patent applications EP 06255239.3 and GB 0700468.2.

Figure 11:
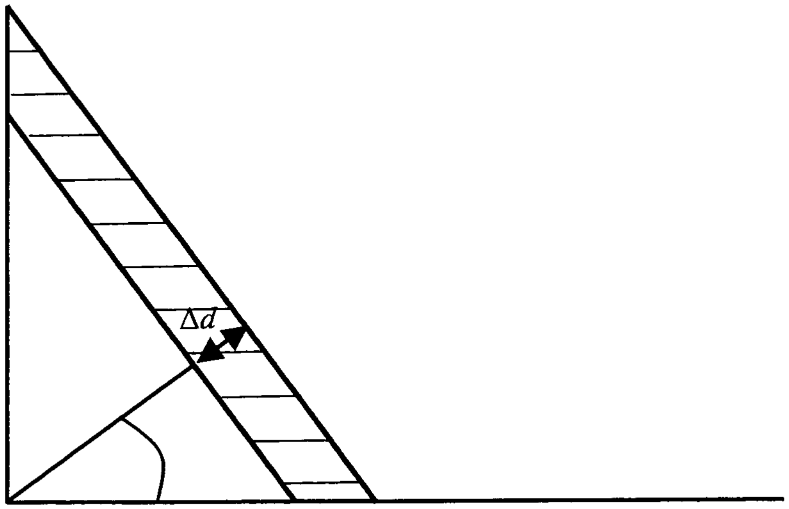
FIG. 11 illustrates the interval strips in the original image when decomposing the d-parameter of Trace transform.
Figure 12:
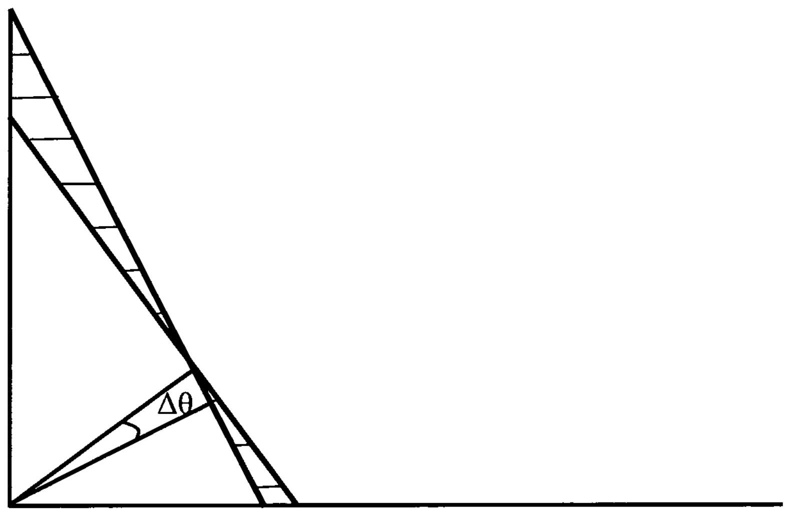
FIG. 12 illustrates the double-cones in the original image when decomposing the θ-parameter of Trace transform.
Figure 13:
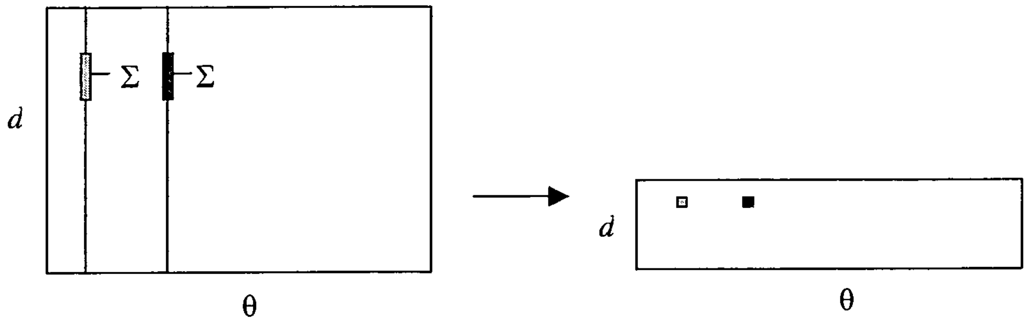
FIG. 13 illustrates the decomposition of the Trace transform in the d-parameter.
Figure 14:
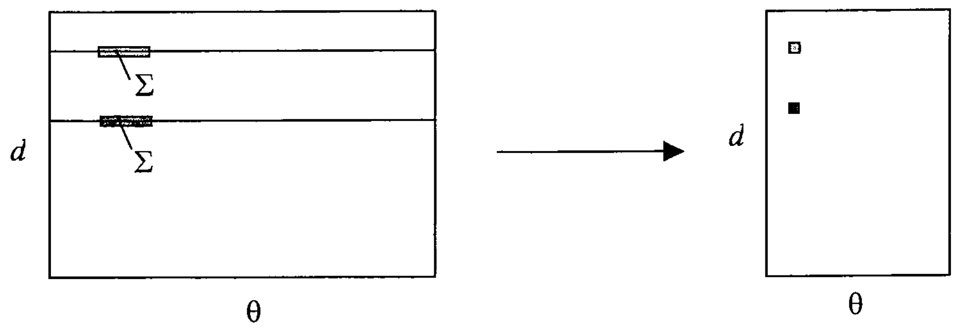
FIG. 14 illustrates the decomposition of the Trace transform in the θ-parameter.

This multi-resolution Trace transform may be created by sub-sampling an original Trace transform in either of its two dimensions, d or θ, or in both dimensions, as described in detail in GB 0700468.2. In the "Trace-domain" sub-sampling the d-parameter is performed by integrating over intervals along the columns, as in FIG. 13. This corresponds to projecting strips of width Δd over the image during the Trace transform, as shown in FIG. 11. Sub-sampling can also take place by integrating over intervals in the θ parameter, that is along the rows, see FIG. 14. This is approximately equivalent to integrating over double-cones with opening-angle Δθ during the Trace transform, see FIG. 12. Alternatively these operations could be performed in the image domain.

Using the method of FIG. 3 with step 150, as disclosed in co-pending patent applications EP 06255239.3 and GB 0700468.2, multiple basic identifiers can be extracted from a Trace transform by using a multi-resolution decomposition, where sub-sampling takes place over a range of different interval widths to generate the multi-resolution representations. Good results were obtained by using a system, where the output of the Trace transform is of size 600×384, and then the d-parameter is sub-sampled by integrating using bands of widths 1, 8, 16, 32, 64 & 128 and applying the diametrical functionals, as defined e.g. in equations (2) and (11), to obtain 12 circus functions. Such a combination gives a 98% detection rate at a 1 ppm false acceptance rate.

Nevertheless, many applications require lower false acceptance rates than 1 ppm with the detection rate above 98%. An implementation of the present invention, as described in more detail below, has been shown experimentally to provide detection rates of over 99.8% with a false acceptance rate of less than 0.1 ppm.

As explained above, the identifiers presented in co-pending patent applications EP 06255239.3 and GB 0700468.2 are extracted by projecting every possible line over an image and then projecting this information into 1D. The representations disclosed in accordance with embodiments of the present invention only use a subset of the lines to form a plurality of alternative 1D representations of the image.

In particular, to extract an identifier from a subset of lines over the image, an equivalent of the circus function is defined, termed the "circus-band function" which maps values of a two dimensional function, in particular the Trace transform, of the subset of lines over the image to 1D. Thus, the circus-band function effectively restricts the extraction of the identifier to a part of the image. This is achieved by selecting a part of the Trace transform of the whole of the image, and using the values of the Trace transform within the selected part to derive the image identifier.

Figure 15:
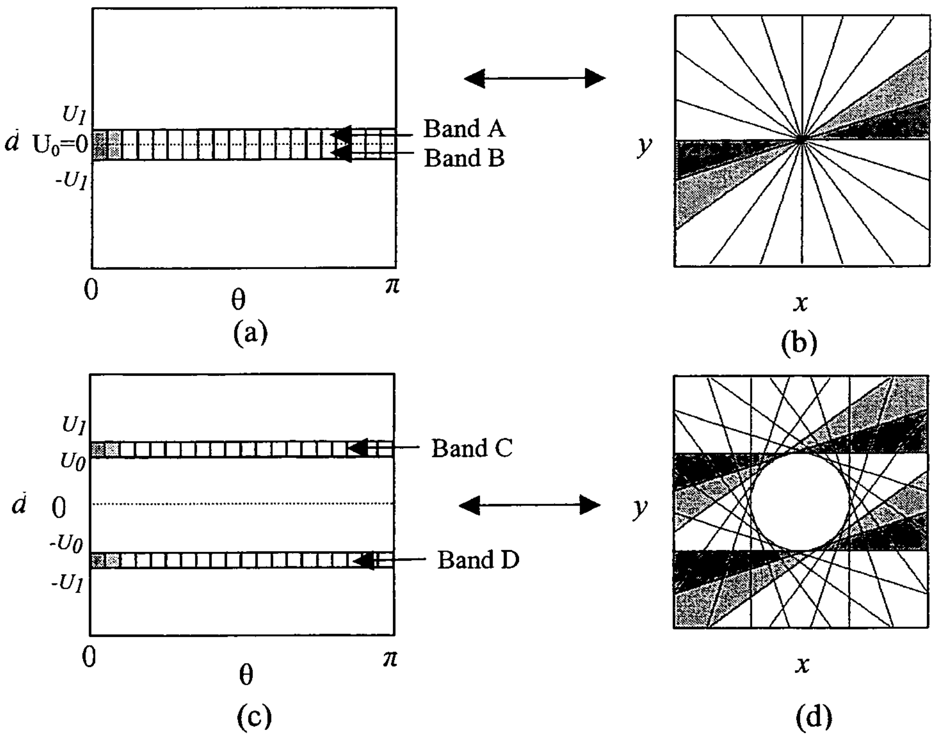
FIG. 15 illustrates the equivalence between bands in the Trace domain and lines in the image domain.

In one embodiment, the selected part of the Trace transform is defined by the range for distance parameter d ($u_0 \leqq d \leqq u_1$). As shown in FIG. 15(*a*) this corresponds to a horizontal band ($u_0,u_1$) (band A) which extends across all values for the angle parameter θ in the Trace domain. The horizontal band may be divided into segments, each corresponding to a range of values for θ in the Trace domain. Each segment of band A is equivalent to all the lines extending through the apex of the corresponding double cone regions in the image domain as shown in FIG. 15(*b*). Thus, the light/dark grey shaded segment of band A in FIG. 15(*a*) corresponds to the light/dark grey shaded region in the top half of FIG. 15(*b*).

It is noted that, for efficiency, in the preferred embodiment the Trace transform is only performed over angles θ from 0 to π (0 to 180 degrees). Therefore, to maintain rotational invariance it is necessary to take bands in pairs centred about the horizontal midline (i.e. centre value) for the distance parameter d (in FIGS. 15(*a*) & 15(*b*) the midline corresponds to d=0). As shown in FIG. 15(*a*), bands A and B are paired, with the light/dark grey shaded segment of band B in FIG. 15(*a*) corresponding to the light/dark grey shaded region in the bottom half of FIG. 15(*b*). FIG. 15(*c*) similarly shows paired bands C and D in the Trace domain, which are spaced equidistant from the midline value, and the corresponding double cones in the image domain, with segments shaded for illustration.

In an embodiment, the pair of bands are combined and the functional G is used to map them to a 1D function g(θ) known as the band-circus function. The band-circus function g(θ) can be obtained by multiplying the Trace transform T(d,θ) and a mask function β defined as $$g(\theta) = G(T(d, \theta)\beta(d, \theta)), \tag{12}$$

where $$\beta(d, \theta) = \begin{cases} 1, & |d| \in (u_0, u_1] \\ 0, & \text{otherwise,} \end{cases} \quad 0 \le u_0 < u_1. \tag{13}$$

In equation (12), G is a functional that operates along the d parameter of the extracted bands of the Trace transform. The two values $u_0$ and $u_1$ in equation (13) define the location and width of the band. The larger the difference $u_1-u_0$ the thicker the bands.

Figure 16:
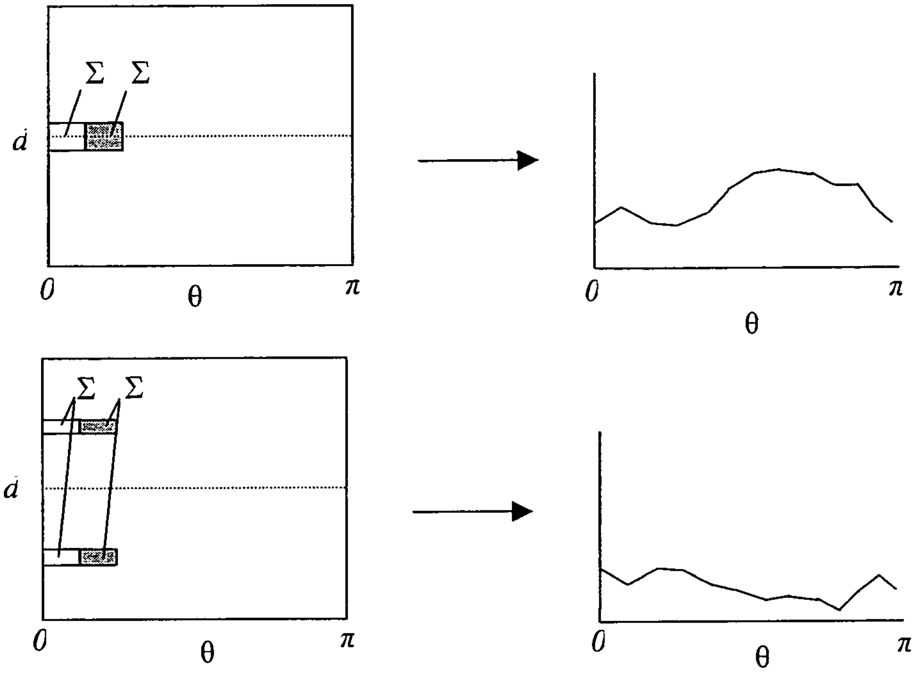
FIG. 16 illustrates the extraction of a 1D representation of the bands from a Trace transform.

A lower resolution description of the band-circus function g(θ) can be obtained by decomposition in the angle (θ) as shown in FIG. 16. This decomposition corresponds to taking double cones in the image domain. The decomposition is preferably integration over intervals of width Δθ, it may also be any suitable functional over the interval that enables a reduction in resolution of the image data.

To extract a binary representation the same technique as described by equations (4)-(9), corresponding to steps 160-180 of FIG. 3, can be applied to the band-circus function g(θ) and/or its decomposed version. A preferred embodiment of the invention extracts 5 (five) band pairs from the Trace transform, one across the midline (centre value for the distance parameter) and four evenly distributed across the central half of the remaining parameter space. These bands are of width 2 pixels in the Trace domain and functional G is given by equation (1). The 5 band-circus functions obtained are decomposed, to reduce the resolution by a factor of six in the angle dimension to obtain the final 5 band-circus functions. High performance is obtained by combining the basic identifiers extracted from the final 5 band-circus functions with the 12 identifiers from the multi-resolution Trace transform to form a complete identifier for an image which contains 17 basic identifiers.

Figure 8:
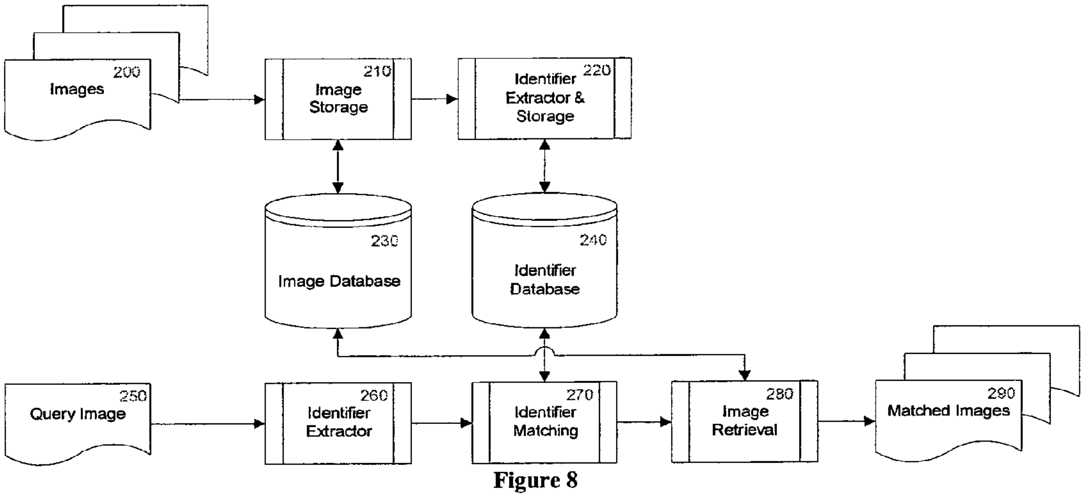
FIG. 8 is a block diagram of an apparatus according to an embodiment of the invention.

An example of an apparatus for an application of the invention according to an embodiment of the invention for carrying the above methods is shown in FIG. 8. The application involves building a database of identifiers 240 for images stored in a database 230. The two databases 230 and 240 may be the same or separated databases. The apparatus allows searching for the identifier 260 extracted from a query image 250 to find matches in the database. A, possibly ordered, list of images is returned to the user 290 or query application.

One particular application of the identifier is as an image search engine. A database is constructed by extracting and storing the binary identifier along with associated information such as the filename, the image, photographer, date and time of capture, and any other useful information. Then given a query image $a_q$ the binary identifier is extracted and is compared with all identifiers in the database $B_0 \ldots B_M$. All images with a Hamming distance to the query image below a threshold are returned.

Alternative Implementations

A range of different Trace and diametrical functionals can be used, for example (a non-exhaustive list):

$$\int \xi(t)dt, \tag{A1}$$

$$\left(\int |\xi(t)|^q dt\right)^r, \text{ where } q > 0 \tag{A2}$$

$$\int |\xi(t)'|dt, \tag{A3}$$

$$\int (t - X1)^2 \xi(t)dt, \text{ where } X1 = \frac{\int t\xi(t)dt}{A1} \tag{A4}$$

$$\sqrt{\frac{A4}{A1}}, \tag{A5}$$

$$\max(\xi(t)), \tag{A6}$$

$$A6 - \min(\xi(t)). \tag{A7}$$

A different combination of binary identifiers may be combined to provide optimum trade-off between complexity, robustness and descriptor size. Alternative binary identifiers may be extracted by altering the Trace functionals, diametrical functionals, decompositions and bands.

The mask function $\beta$ given by equation (13) is just one possibility for the mask function. Other functions of d and $\theta$ can be used to extract alternative subsets of lines from which further information can be extracted.

For geometric transformations of higher order than rotation, translation and scaling the version of the identifier described above is not appropriate; the relationship in equation (3) does not hold. The robustness of the identifier can be extended to affine transformations using a normalisation process full details of which can be found in reference [2] infra. Two steps are introduced to normalise the circus function, the first involves finding the so called associated circus the second step involves finding the normalised associated circus function. Following this normalisation it is shown that the relationship in equation (3) is true. The identifier extraction process can now continue as before.

Some suitable Trace functionals for use with the normalisation process are given below in (G1) & (G2), a suitable choice for the diametrical functional is given in (G3).

$$T(g(t)) = \int_{R^+} rg(r)\,dr, \tag{G1}$$

$$T(g(t)) = \int_{R^+} r^2 g(r)\,dr, \tag{G2}$$

$$P(h(t)) = \sum_k |h(t_{k+1}) - h(t_k)|, \tag{G3}$$

where $r \equiv t-c$, $c \equiv \text{median}(\{t_k\}_k, \{|g(t_k)|\}_k)$. The weighted median of a sequence $y_1, y_2, \ldots, y_n$ with nonnegative weights $w_1, w_2, \ldots, w_n$ is defined by identifying the maximal index m for which $$\sum_{k<m} w_k \le \frac{1}{2}\sum_{k\le m} w_k, \tag{14}$$

assuming that the sequence is sorted in ascending order according to the weights. If the inequality (14) is strict the median is $y_m$. However, if the inequality is an equality then the median is $(y_m+y_{m-1})/2$.

A multi-resolution decomposition of the Trace transform can be formed as described above by summing over intervals of the parameter (either d or $\theta$). It is not obligatory to take the sum, other possibilities include statistics such as the mean, max, min etc. Other functionals may also be applied over these intervals.

The functional G is not restricted to equation (1) and it is possible to use alternative functionals. Multiple identifiers can be extracted from a single band by decomposing by different values, in the preferred embodiment a factor of six was used, other factors may be used to generate alternative identifiers. It has been found by experimentation that the bands around the centre of the Trace transform have good robustness to cropping.

A structure could be applied to the identifier to improve search performance. For example a two pass search could be implemented, half of the bits are used for an initial search and then only those with a given level of accuracy are accepted for the second pass of the search.

The identifier can be compressed to further reduce its size using a method such as Reed-Muller decoder or Wyner-Ziv decoder.

Alternative Applications

The identifier can also be used to index the frames in a video sequence. Given a new sequence identifiers can be extracted from the frames and then searching can be performed to find the same sequence. This could be useful for copyright detection and sequence identification.

Multiple broadcasters often transmit the same content, for example advertisements or stock news footage. The identifier can be used to form links between the content for navigation between broadcasters.

Image identifiers provide the opportunity to link content through images. If a user is interested in a particular image on a web page then there is no effective way of finding other pages with the same image. The identifier could be used to provide a navigation route between images.

The identifier can be used to detect adverts in broadcast feeds. This can be used to provide automated monitoring for advertisers to track their campaigns.

There are many image databases in existence, from large commercial sets to small collections on a personal computer. Unless the databases are tightly controlled there will usually be duplicates of images in the sets, which requires unnecessary extra storage. The identifier can be used as a tool for removing or linking duplicate images in these datasets.

Upon receiving a poor quality, possibly heavily compressed, image a user may wish to find a higher quality version. The identifier may be used to search a database on the internet for a high resolution version.

In this specification, the term “image” is used to describe an image unit, including after processing, such as filtering, changing resolution, upsampling, downsampling, but the term also applies to other similar terminology such as frame, field, picture, or sub-units or regions of an image, frame etc. In the specification, the term image means a whole image or a region of an image, except where apparent from the context. Similarly, a region of an image can mean the whole image. An image includes a frame or a field, and relates to a still image or an image in a sequence of images such as a film or video, or in a related group of images. The image may be a greyscale or colour image, or another type of multi-spectral image, for example, IR, UV or other electromagnetic image, or an acoustic image etc.

In certain embodiments, a Fourier transform is used to derive a frequency representation. However, it will be appreciated that a frequency representation can also be derived using other techniques such as a Haar transform. In the claims, the term Fourier transform is intended to cover variants such as DFT and FFT.

The invention is preferably implemented by processing electrical signals using a suitable apparatus.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the interne.

REFERENCES

[1] Alexander Kadyrov and Maria Petrou, "The Trace Transform and Its Applications", IEEE Trans. PAMI, 23 (8), August, 2001, pp 811-828.

[2] Maria Petrou and Alexander Kadyrov, "Affine Invariant Features from the Trace Transform", IEEE Trans. on PAMI, 26 (1), January, 2004, pp 30-44.

[3] Paul Brasnett and Miroslaw Bober, "A Robust Visual Identifier Using the Trace Transform", Int. Conf. on Visual Information Eng. 2007 (VIE2007), July, 2007.

[4] Paul Brasnett and Miroslaw Bober, "Multi-Resolution Trace Transform for Image Identification", IEEE Int. Conf. on Computer Vision (ICCV 2007), October, 2007, submitted.

[5] Handbook of Global Optimization, Ed. P. M. Pardalos and H. E. Romeijn, Springer 2002.

As the skilled person will appreciate, many variations and modifications can be made to the described embodiments. For example, the present invention can be implemented in embodiments combining implementations of other existing and related techniques, such as those taught in the above identified references. Such combinations of existing and related technologies will be readily apparent to the skilled person and it is intended to include all such combinations, and all such modifications and equivalents to the described embodiments that fall within the scope of the present invention.

The invention claimed is:

1. A method of deriving a representation of an image by processing signals corresponding to the image, the method comprising:

deriving a Trace transform of the image;

processing said Trace transform to obtain a plurality of intermediate representations of parts of the image, and deriving the representation of the image from the intermediate representations, wherein the intermediate representations are obtained by selecting parts of the Trace transform, and the step of selecting parts of the Trace transform includes defining bands of values in the Trace transform, each band defined by a predetermined range of a distance parameter of the Trace transform.

2. A method as claimed in claim 1, wherein the intermediate representation is a one dimensional function of at least part of the image.

3. A method of deriving a representation of an image by processing signals corresponding to the image, the method comprising;

deriving a Trace transform of at least part of the image;

processing the Trace transform to Obtain an intermediate representation of at least part of the image: and deriving the representation of the image from the intermediate representation, wherein the intermediate representation is obtained using a selected part of the image, by selecting as a selected part of the image, a subset of lines over the image, wherein the selected part of the image comprises double cones and each of the lines of the subset of lines passes through the apex of said double cones, and deriving said Trace transform using said selected subset of lines.

4. A method as claimed in claim 1, wherein the step of processing the two dimensional function of the image includes multiplying the two dimensional function with a mask function defining said part of the two dimensional function.

5. A method as claimed in claim 1, wherein the two dimensional function of the image comprises a distance parameter and an angle parameter, and said part of the two dimensional function is defined by at least one band between values $u_0$, and $u_1$ of the distance parameter.

6. A method as claimed in claim 1, comprising defining a pair of bands, the ranges of which are equidistant about a centre value of the distance parameter of the two dimensional function.

7. A method as claimed in claim 1, the step of processing the two dimensional function comprises:

applying a functional to values of said selected part of the Trace transform to obtain an intermediate representation of a selected part of the image.

8. A method as claimed in claim 7, wherein said intermediate representation is a one dimensional function of at least a part of the image.

9. A method as claimed in claim 8, wherein the one dimensional function is defined by the equation:

$$g(\theta)=G(T(d,\theta)\beta(d,\theta)),$$

where:

G is a diametrical functional that operates along the distance parameter of the selected part of the Trace transform T is a functional of a Trace transform d and θ are the distance and angle parameters of the traced lines in the Trace transform, and β is a mask function defining a selected part of the Trace transform.

10. A method as claimed in claim 6, wherein the mask function defines a band of values of the Trace transform with the distance parameter d ($u_0$<d<$U_y$), and is defined as:

[0, otherwise $$\beta(d,\theta)=\begin{cases}1, & |d|\in(u_0,u_1]\\ 0, & \text{otherwise,}\end{cases}\quad 0\le u_0<u_1.$$

11. A method as claimed in claim 1, wherein the Trace transform is performed over values for the angle parameter in the range 0 to 180 degrees.

12. A method as claimed in claim 1, wherein the step of deriving the representation of the image from the intermediate representation comprises:

using a plurality of frequency components of a frequency representation of the intermediate representation, to derive the representation of the selected part of the image.

13. A method as claimed in claim 12, further comprising:

defining a representation function using magnitudes of the frequency components, and using the magnitude of the frequency components to derive the representation of the selected part of the image.

14. A method as claimed in claim 1, wherein the step of deriving the representation of the image from the intermediate representation, comprises combining the derived representation of the selected part of the image with one or more other representations of the image.

15. A method as claimed in claim 1, further comprising:

reducing the resolution of the two-dimensional function and/or the intermediate representation.

16. A method of deriving a representation of an image by processing signals corresponding to the image, the method comprising:

extracting from the image a substantially circular sub-image, the sub-image having a tapered circular boundary, and deriving the representation of the image from the extracted circular sub-image, using the method as claimed in claim 1.

17. A method of identifying an image comprising:

deriving a representation of the image using a method is claimed in claim 1, and associating the representation with the image.

18. A method of comparing images comprising comparing representations of each image derived using the method of claim 1.

19. A method as claimed in claim 18, wherein the comparison comprises determining a Hamming distance.

20. A method as claimed in claim 18, comprising selecting images based on comparisons of representations.

21. The method of claim 1, further comprising transmitting, receiving, or processing, the representation of the image.

22. An apparatus comprising:

a processor and a memory, the memory storing a computer program which when executed causes the processor to perform the steps of claim 1.

23. A computer program stored on a non-transitory computer-readable medium for executing the method of claim 1.

* * * * *